United States Patent
Jakobson

[11] Patent Number: 5,964,402
[45] Date of Patent: Oct. 12, 1999

[54] APPARATUS AND METHOD FOR HEATING A GROUND SURFACE OR VOLUME OF AIR WITH A PORTABLE HOT WATER-TYPE HEATING SYSTEM

[75] Inventor: Jerome T. Jakobson, Spicer, Minn.

[73] Assignee: T.H.E. Machine Company, Wilmar, Minn.

[21] Appl. No.: 08/946,505

[22] Filed: Oct. 7, 1997

[51] Int. Cl.$^6$ ................................................. F24D 5/10
[52] U.S. Cl. ............................................................ 237/69
[58] Field of Search ....................... 237/69, 59; 138/26; 137/505; 126/367

[56] References Cited

U.S. PATENT DOCUMENTS

| | | |
|---|---|---|
| 462,179 | 10/1891 | Turley et al. . |
| 1,587,984 | 6/1926 | Pearce . |
| 3,195,619 | 7/1965 | Tippmann . |
| 3,274,785 | 9/1966 | Lange . |
| 3,293,863 | 12/1966 | Cox et al. . |
| 3,758,748 | 9/1973 | Reid . |
| 3,791,443 | 2/1974 | Burt et al. . |
| 3,818,712 | 6/1974 | Burt et al. . |
| 3,868,825 | 3/1975 | Boyce . |
| 3,976,125 | 8/1976 | Best . |
| 4,305,681 | 12/1981 | Backlund . |
| 4,314,772 | 2/1982 | Lestraden . |
| 4,349,010 | 9/1982 | Bentham . |
| 4,646,818 | 3/1987 | Ervin, Jr. . |
| 5,024,553 | 6/1991 | Katsuragi . |
| 5,062,736 | 11/1991 | Katsuragi et al. . |
| 5,120,158 | 6/1992 | Husu . |
| 5,181,655 | 1/1993 | Bruckelmyer . |
| 5,244,037 | 9/1993 | Warnke . |
| 5,441,038 | 8/1995 | Ohmann . |
| 5,449,113 | 9/1995 | Bruckelmyer . |
| 5,567,085 | 10/1996 | Bruckelmyer . |
| 5,820,301 | 10/1998 | Bruckelmyer . |

FOREIGN PATENT DOCUMENTS

| | | |
|---|---|---|
| 1158119 | 12/1983 | Canada . |
| 27 06 740 A1 | 8/1978 | Germany . |

Primary Examiner—Henry Bennett
Assistant Examiner—Derek S. Boles
Attorney, Agent, or Firm—Patterson & Keough, P.A.

[57] ABSTRACT

A flexible fluid-filled circulation conduit is selectively and removably connectable to a portable hot water heating system. The conduit is configured and arranged so that prior to connection to the hot water heating system, the conduit carries its own fluid supply under pressure within the conduit for circulation through the hot water heating system. Upon removable connection of the fluid filled conduit to the hot water heating system, fluid from the conduit immediately circulates under pressure with fluid from the hot water heating system through both the conduit and hot water heating system. Upon selective disconnection of the conduit from the hot water heating system, fluid within the conduit is retained under pressure within the conduit and fluid continues to circulate through the hot water heating system but is prevented from circulating through the conduit. With this system, fluid need not be directly added or removed relative to the hot water heating system to accommodate adding or removing the conduit relative to the hot water heating system circulation loop. This system can be used in a method of thawing frozen ground or of providing temporary heat within a building.

19 Claims, 7 Drawing Sheets

APPARATUS AND METHOD FOR HEATING A GROUND SURFACE OR VOLUME OF AIR WITH A PORTABLE HOT WATER-TYPE HEATING SYSTEM

BACKGROUND OF THE INVENTION

1. Field of the Invention

The present invention relates to hot water heating systems and in particular, relates to an apparatus and method of heating a ground surface or volume of air with a portable hot water heating system.

2. Description of Related Art

Cold weather climates present a variety of special problems requiring temporary heating of a ground surface or a volume of air. For example, construction of homes, buildings and other structures during the winter months must account for an air temperature below freezing for an extended period of time, on the order of two to four months. In these situations, ordinary tasks such as excavating frozen ground to build a basement can become costly and impractical. Moreover, assuming a structure is built in these conditions, temporary heating of the structure is necessary to permit workers to function comfortably within the building until a permanent heating system is installed and functioning, or to permit curing of concrete work (e.g. a basement floor) within the building.

Current solutions to these problems are undesirable because of the inadequacy and the cost of heating the ground surface or volume of air, as well as safety concerns introduced by the temporary heating solution. For example, Bruckelmyer U.S. Pat. No. 5,567,085 addresses the curing of frozen concrete by delivering a heated fluid through a hose placed next to a concrete form. The hose defines one long continuous circulation path for the heated fluid. In this method, an aggregate material is laid over the hose to retain heat radiated by the hose and to assist in the laying and setting of the concrete. However, in this method, the heated fluid is allowed to drain onto the ground and the hose is permanently left in the concrete with the ends of the hose being severed. This destruction of the hose necessarily requires that a new hose be used for each application of the method. The Bruckelmyer patent also offers no solution of how heated fluid is supplied to the hose in an efficient and environmentally safe manner.

One current method of temporary heating of a building includes the use of propane fuel burners in the building. This method, and similar approaches can create a fire hazard because of an open flame and can create an air safety hazard because of carbon dioxide and carbon monoxide discharge as well as noxious fume discharge associated with these open burning propane heaters.

These examples present imperfect solutions to the challenges of cold weather construction. Accordingly, construction in cold weather slows dramatically, creates increased hazards and costs, and adds pressure on contractors to complete work in warmer weather. Given the large expanse of cold weather climates, improvements in coping with cold weather construction are highly desirable.

SUMMARY OF THE INVENTION

An apparatus used in a method of the present invention comprises a portable hot water heating system and a flexible conduit removably connectable to the hot water heating system. In application, the apparatus is adapted for cold weather use to aid in supplying temporary heat within a building or to thaw frozen ground.

In a method of thawing frozen ground, the portable hot water heating system and one or more flexible conduits (e.g. hose) are placed adjacent an area of frozen ground. With the portable hot water heating system circulating a heated fluid (e.g. antifreeze solution) under pressure, two access points (e.g. ends) of at least one fluid-filled conduit are connected to the hot water heating system permitting circulation of heated fluid through both the conduit and the hot water heating system. When multiple conduits are connected to the hot water heating system in parallel, each conduit comprises its own independent zone of circulation of heated fluid with the hot water heating system.

In this example, each conduit connected to the hot water heating system is placed on top of an area of frozen ground, allowing heated fluid to circulate through the conduit over the ground. Heat radiated through the conduit from the fluid heats the ground. The conduit is maintained in this position for a predetermined period of time to obtain the desired thermal effect, e.g. thawing frozen ground. The manner of construction of the conduit permits this method to be performed without spilling any fluid on the ground and while maintaining the fluid volume of the hot water heating system and of the flexible conduit.

The flexible conduit is configured and arranged at its ends so that, prior to connection to the hot water heating system, the conduit carries its own fluid supply of an antifreeze solution under pressure within the conduit for circulation through the hot water heating system. Upon removable connection of the ends of the fluid-filled conduit to the hot water heating system, fluid from the conduit immediately circulates under pressure with fluid from the hot water heating system through both the conduit and hot water heating system. Upon selective disconnection of the conduit from the hot water heating system, fluid (e.g. antifreeze solution) within the conduit is retained under pressure within the conduit and fluid continues to circulate through the hot water heating system but is prevented from circulating through the conduit. The unique construction of the fluid-filled conduit, and of a reciprocating manifold of the hot water heating system, allows removable connection of one or more conduits (in parallel) to the hot water heating system wherein fluid need not be directly added to or directly removed from the hot water heating system to accommodate adding or removing the conduits relative to the hot water heating system circulation loop. In addition, with this construction, one or more fluid-filled conduits can be connected to a hot water heating system without requiring a change in the general operating parameters of the hot water heating system.

The apparatus and method of the present invention also includes use in a method of temporary heating. In this method, two flexible fluid-filled conduits (having the previously described structure) are connected between the portable hot water heating system and a portable hot water-type unit heater. The portable hot water heating system is placed outside the building with one end of each of the two conduits removably connected to the hot water heating system. The conduits extend in parallel into the building where the other end of each conduit is removably connected to the unit heater. One conduit establishes a heated fluid supply path from the heating system to the unit heater while the other conduit establishes a heated fluid return path from the unit heater to the hot water heating system. The unit heater radiates heat within the building as heated fluid circulates from the hot water heating system through unit heater and back to the heating system via the fluid supply and return conduits. With the hot water heating system outside the building, no flames or fumes are present in the building.

Accordingly, the apparatus of the present invention including the portable hot water heating system and flexible, removably connectable fluid-filled conduit can be used in an environmentally safe, reusable manner to solve cold weather construction challenges such as thawing frozen ground or temporarily heating a building.

DETAILED DESCRIPTION OF PREFERRED EMBODIMENTS

Figure 1:
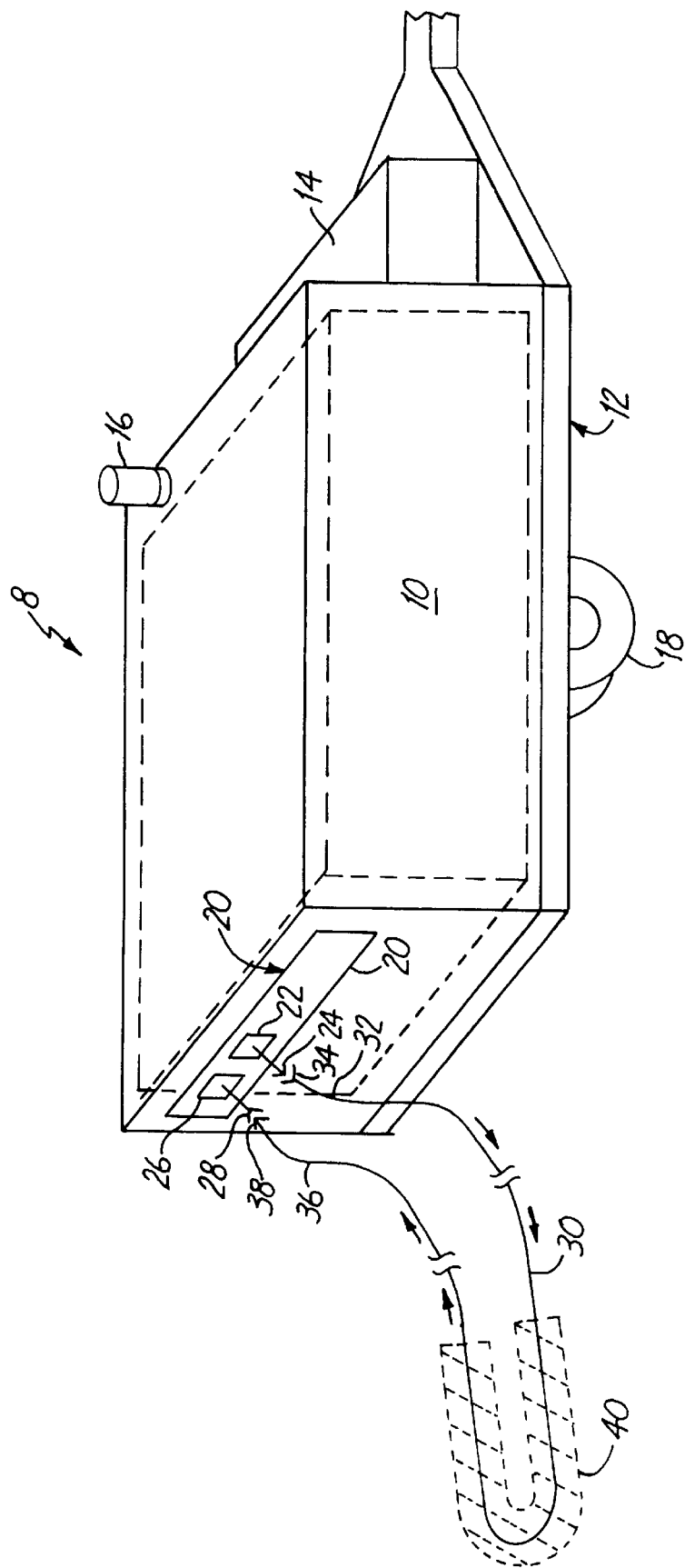
FIG. 1 is an isometric view of a portable hot water heating system and flexible conduit of the present invention used in a method of thawing frozen ground.

Portable heating apparatus 8 of the present invention is illustrated generally in FIG. 1. Heating apparatus 8 includes forced hydronic (i.e. hot water-type) heating system 10 mounted on trailer 12 along with oil tank 14, in-use light 16, and wheels 18. Portable heating apparatus 8 further includes manifold 20, fluid supply station 22 with male quick disconnect valve 24, and fluid return station 26 with female quick disconnect valve 28. Hose 30 accompanies heating system 10 and includes first end 32 with female quick disconnect valve 34 and second end 36 with male quick disconnect valve 38.

Hot water heating system 10 is a closed loop-type forced hydronic system which heats and circulates a supply of non-toxic glycol-based antifreeze solution. This solution is supplied to fluid supply station 22 and quick disconnect valve 24 under pressure at a temperature of 170°. Female quick disconnect valve 34 of hose 30 is removably connected to male quick disconnect valve 24 of fluid supply station 22 while male disconnect valve 38 of hose 30 is removably connected to female disconnect valve 28 of fluid return station 26. When connected as shown, the heated antifreeze solution supplied by hot water heating system 10 continuously circulates into and through hose 30 and returns to hot water heating system 10 through fluid return station 26 for recirculation and reheating in hot water heating system 10.

As shown in FIG. 1, one use of apparatus 8 of the present invention includes connecting hose 30 to hot water heating system 10 via manifold 20 and then laying hose 30 over target zone 40, which comprises an area of frozen ground (or other surface) to be thawed. The heated antifreeze solution flows from hot water heating system 10 under pressure at 170° F., out supply station 22, through hose 30 and over target zone 40. Heat radiates from hose 30 over target zone 40 thereby thawing the frozen ground or otherwise heating the surface of target zone 40. After passing through hose 30, the antifreeze solution enters fluid return station 26 at approximately 150° F. for recirculation and reheating.

Prior to removable connection with heating system 10, hose 30 contains its own fluid supply so that the proper fluid capacity of heating system 10 and hose 30 is achieved with little or no addition of fluid to heating system 10 upon connection of hose 30 to heating system 10. Moreover, upon disconnection of hose 30 from hot water heating system 10, fluid is retained under pressure within hose 30 between quick disconnect valves 34 and 38 with no removal, addition, or spilling of fluid relative to hot water heating system 10.

This unique property of apparatus 8 arises from the construction of hose 30. As supplied with apparatus 8, hose 30 contains a non-toxic antifreeze solution maintained within hose 30 under pressure between quick disconnect valves 34 and 38. Accordingly, hose 30 always carries with it the necessary fluid capacity for connecting the hose 30 to hot water heating system 10. Since antifreeze solution is circulated and maintained under pressure in hot water heating system 10, removably connecting fluid-filled hose 30 to heating system 10 immediately establishes a continuous circulation of heated fluid between the hot water heating system 10 and hose 30. As described in more detail later in this application, several hoses like hose 30 can be connected to hot water heating system 10 without the necessity of adding or removing additional fluid to hot water heating system 10 to compensate for the additional hose footage.

Hose 34 preferably is a Heatway® brand Entran Onix radiant tubing, which is a crushproof, multilayer, elastomeric, industrial-grade rubber hose having a burst pressure of 800 p.s.i. at 70° F., and is obtainable from Heatway Company of Springfield, Mo. Quick disconnect valves 24, 28, 34, and 38, preferably are flush face, non-spill, fluid transfer quick couplings obtainable from Safeway Company of Chaska, Minn. as Model FF49 Series, No. FF49-6.

When connected to a reciprocating quick coupling, each quick coupling is in an open mode and permits high pressure, high flow passage of fluid therethrough. When disconnected from a reciprocating quick coupling, each quick coupling is in a closed mode and prevents the passage of fluid therethrough. The female couplings are constructed to facilitate easy connection to a male quick coupling via a sleeve slidably movable relative to a body of the female quick coupling. The sleeve of the female coupling cooperates with a male coupling to effect removable connection and disconnection of the male and female reciprocating couplings without spilling or leaking fluid. Accordingly, when each end of hose 30 includes a quick coupling (e.g. quick disconnect valves 34 and 38), fluid can be retained under pressure within hose 30 and available for selective flow upon removable connection of valves 34 and 38 to reciprocating quick disconnect valves such as valves 24 and 28.

Figure 2:
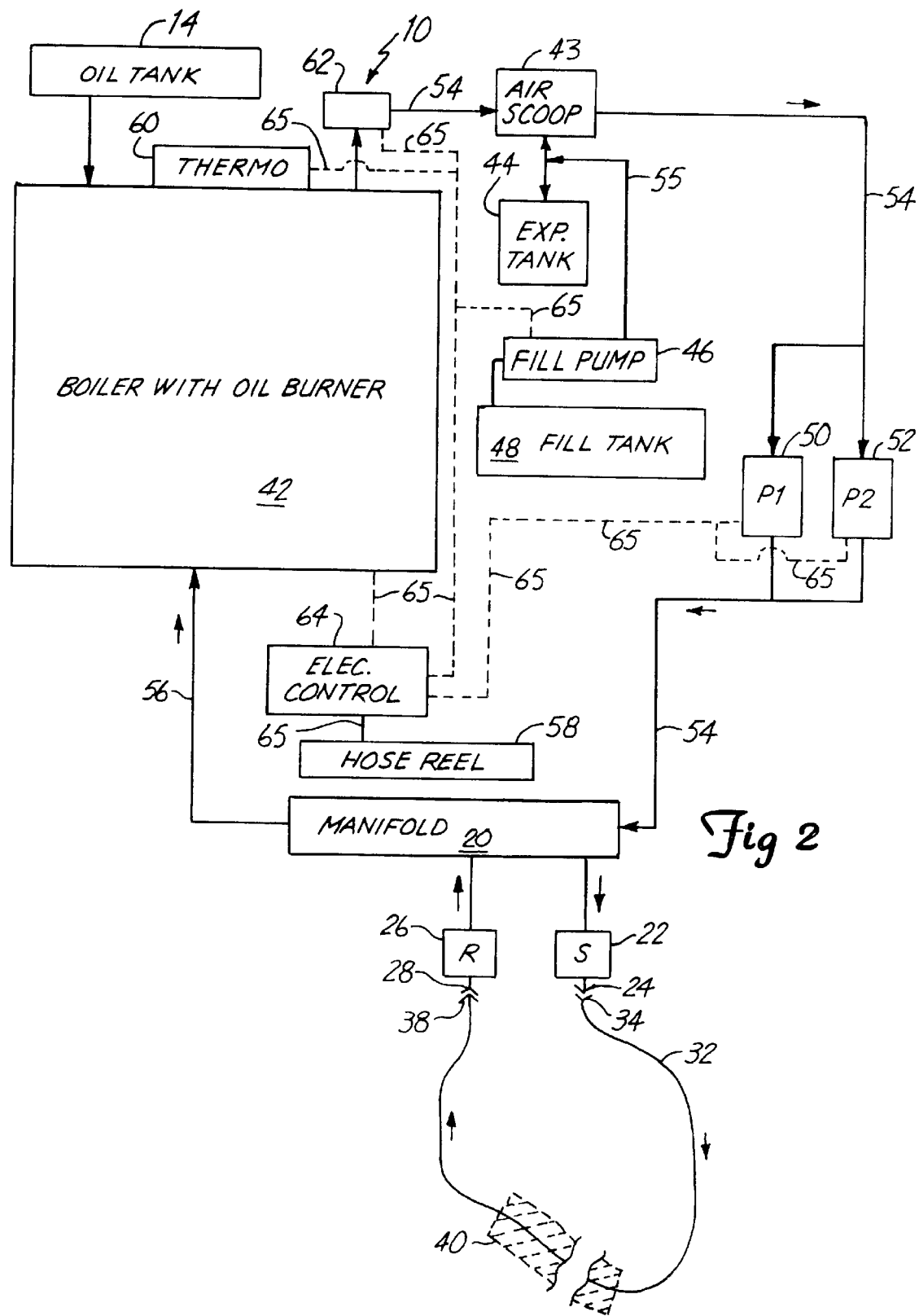
FIG. 2 is a schematic diagram a portable hot water heating system and flexible conduit of the present invention.

FIG. 2 is a schematic diagram illustrating the components of hot water heating system 10 and their relationship to manifold 20 and hose 30. Heating system 10 includes oil tank 14, boiler 42 (with oil burner), air scoop 43, expansion tank 44, fill pump 46, fill tank 48 and circulating pumps 50 and 52. Fluid supply conduit 54 extends between the respective components of hot water heating system 10 and establishes fluid communication therebetween while fluid return conduit 56 extends between manifold 20 and boiler 42. Hot water heating system 10 further includes thermostat control 60, high limit control 62 and electrical controls 64. Electrical controls 64 electrically connects various components of the hot water heating system 10, via electrical connection network 65, including thermostat 60, high limit control 62, fill pump 46, and circulating pumps 50 and 52 as well as hose reel 58.

Elements of hot water heating system 10 comprise elements generally known in the art. For example, boiler 42 preferably is an oil-fired boiler Model Number. FT-900, including a Beckett Model AFG oil burner, both obtainable from Columbia Boiler Company of Pottstown, Pa. Oil tank 14 supplies boiler 42 with a supply of oil via a pump (not shown). Antifreeze solution is heated by boiler 42 and then passed along supply conduit 54 through high limit control 62, air scoop 43, circulating pumps 50 and 52 and then further along supply conduit 54 into manifold 20. Expansion tank 44, fill pump 46 and fill tank 48 are connected to and in fluid communication air scoop 43 and supply line 54 via lateral conduit piping 55. Air scoop 43 is a conventional air purger and float vent that eliminates excess air from the heated antifreeze solution coming from boiler 42 while expansion tank 44 accommodates expansion and contraction of antifreeze solution as it passes through hot water heating system 10. Fill tank 48 acts as a makeup tank permitting additional fluid to be added to the hot water heating system 10 and supply conduit 54 (via fill pump 46) when a catastrophic loss of fluid occurs or other condition necessitates the addition of fluid to system 10. Expansion tank 44 preferably is a EXTROL® diaphragm-type expansion tank obtainable from Amtrol, Inc. of West Warwick, R.I. Fill pump 46 preferably is a self-priming centrifugal pump, Model 1ACE, obtainable from Covert Pump Division of Covert Manufacturing, Inc. of Galion, Ohio.

Circulating pump 50 maintains circulation of heated antifreeze solution through supply conduit 54 so that fluid is supplied under pressure and circulates through fluid supply station 22 of manifold 28 on demand. Heating system 10 is designed to operate with a single circulating pump 50. However, circulating pump 52 is provided as an option for use with pump 50 when extra pumping capability is required, as will be explained later in greater detail regarding a remote manifold system of the present invention. When pump 52 is incorporated into heating system 10, pump 52 is arranged in parallel with pump 50 as shown in FIG. 2 to ensure high speed flow of the antifreeze solution. Circulating pumps 50 and 52 are preferably Series 1535 close coupled centrifugal pumps and can be obtained from ITT Bell & Gossett of Morton Grove, Ill.

Electrical control 64 comprises a control system known to those in the art to enable powering elements of the hot water heating system in an on/off state as well as providing a circuit breaking system for safety. As shown, electrical controls 64 is electrically connected to boiler 42, thermostat 60, high limit control 62, fill pump 46, and pumps 50, 52 via electrical connection line 65. High limit control 62 preferably is an immersion-type controller Aquastat® relay, Model L8148A, obtainable from Honeywell, Inc. of Minneapolis, Minn. Limit control 62 controls deactivation of oil burner of boiler to maintain fluid temperature at or below a selected limit.

Electrical control 64 is also connected to hose reel 58. Hose reel 58 is configured to permit one or several hoses to be wound about hose reel 58 and is configured mechanically and connected electrically to permit automatic dispensing of hoses like hose 30 from hose reel 58 and to permit automated winding of hoses on hose reel 58. Apart from the unique construction of hose 30 and manifold 20, hot water heating system 10 as shown in FIG. 2 is constructed and operated within parameters and using principles well known in the art of low temperature hot water heating systems such as those identified in the 1996 ASHRAE handbook on Heating, Ventilating, and Air Conditioning (HVAC) Systems and Equipment.

As previously described, hot water heating system 10 shown in FIG. 2 heats and circulates a non-toxic antifreeze base solution under pressure to be accessed by hose 30 at fluid supply station 22 and fluid return station 26 of manifold 20.

Figure 3:
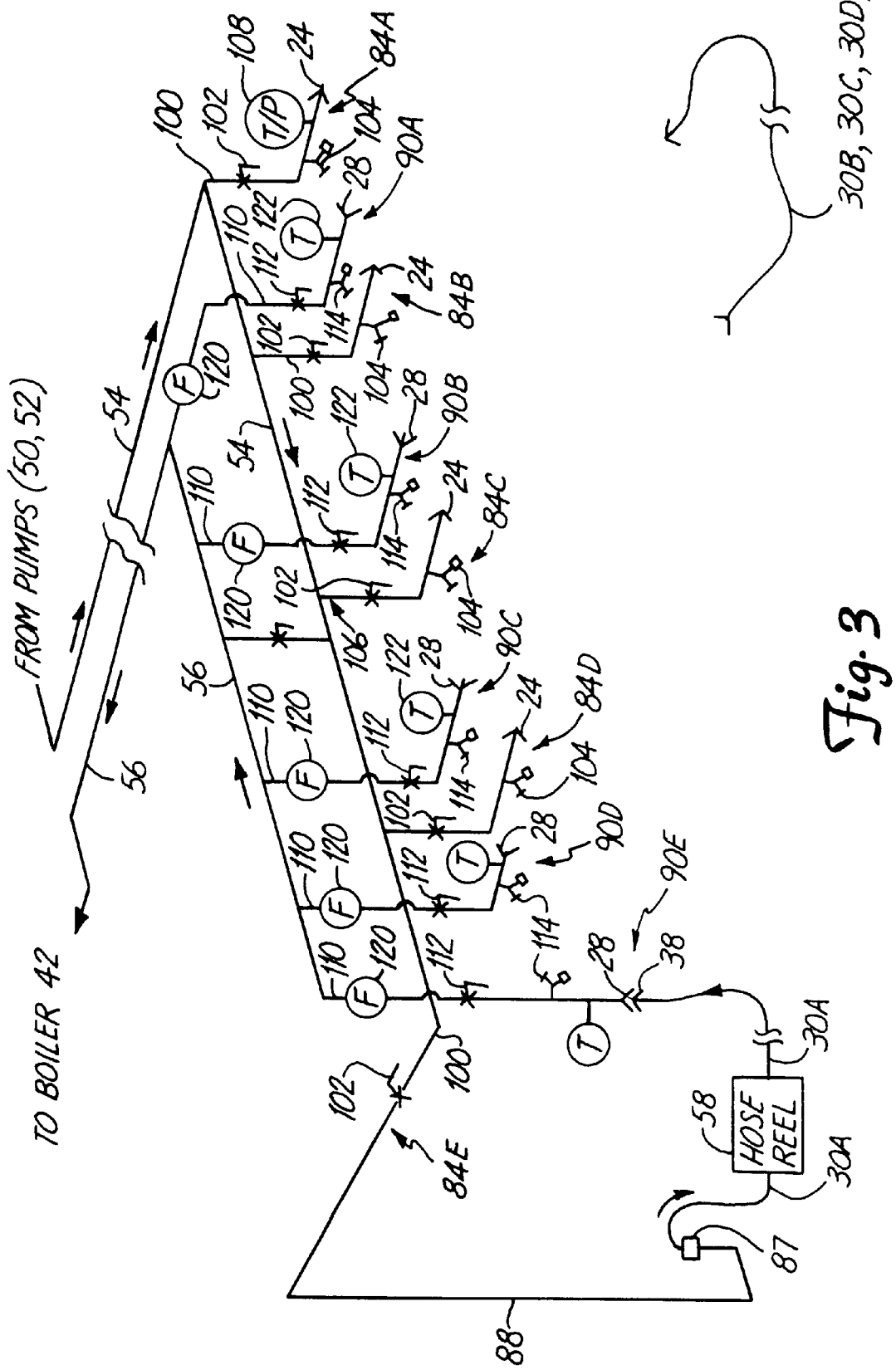
FIG. 3 is a isometric view schematically illustrating a manifold of a portable hot water heating system of the present invention.

Manifold 20 is shown in greater detail in FIG. 3 and includes fluid supply stations 84A–84E (corresponding to supply station 22 in FIGS. 1 and 2) and fluid return stations 90A–90E (corresponding to fluid return station 26 in FIGS. 1 and 2). Each supply station 84A–84D includes manual ball valve 102, manual boiler drain-type valve 104, and male quick disconnect valve 24, and is connected to supply line 54 via station supply line 100. Supply station 84A also includes temperature and pressure gauge 108 for indicating the temperature and pressure of fluid in fluid supply line 54. Supply station 84E also includes extended supply connector 88, which extends between manual ball valve 102 and connector 87 of supply station 84E.

As shown in FIG. 3, each fluid return station 90A–90E includes manual ball valve 112, manual boiler drain-type valve 114, female quick disconnect valve 28, fluid temperature indicator 122, and return fluid flow indicator 120. Each fluid return station 90A–90E is connected to main fluid return line 56 via station connecting lines 110.

Manual ball valve 102 of supply stations 84A–84E is a conventional ball valve capable of opening and closing to respectively permit and prevent fluid flow from supply line 54 through connecting line 100 to boiler drain valve 104 or quick disconnect valve 24. Boiler drain-type valve 104 of supply stations 84–84D includes a hand wheel for controlling opening and closing of the valve and a female or male connector for receiving the end of a hose to be supplied. Manual boiler drain valve 104 is used as an alternative connection point to quick disconnect valve 24.

Quick disconnect valve 24 is a male dripless quick disconnect valve capable of connecting to a reciprocating female dripless quick disconnect valve (e.g. valve 28 on the end of hose 32). Upon removable connection or disconnection of a pair of reciprocating male and female dripless quick disconnect valves, fluid within hose 30 is retained therein under pressure and no fluid is lost outside of hose 30 or manifold 20. Valve 24 is located on each of the supply stations 84A–84D. Instead of having a quick disconnect valve 24, supply station 84E includes a nonremovable connector 87 to connect line 88 to the end of hose 30A.

As shown in FIG. 3, return supply stations 90A–90E include a manual ball valve 112 for selectively permitting or preventing fluid from flowing into return line 56. Manual boiler drain-type valve 114 of return stations 90A–90E includes a hand wheel and a respective male/female connector for connection to a hose to be supplied. Valve 28 of return stations 90A–90E is a dripless quick disconnect valve substantially similar to supply valve 24, except including a female receptacle connector. Temperature gauge 122 of return stations 90A–90E is secured to return line 110 for indicating the temperature of fluid entering the fluid return station 90A–90E from a hose 30. Return flow indicator 120 of return stations 90A–90E is secured in return line 110 between the main line 56 and manual ball valve 112 to indicate the presence of fluid flowing through return line 110. Return flow indicator 120 preferably is a pinwheel-type/propeller flow indicator known in the art that permits visual inspection to instantly identify that return circulation is occurring.

Fluid supply station 84E and fluid return station 90E have special adaptations. Supply station 84E and return station 90E are permanently connected to hose 30A, which is wound about hose reel 58 on the inner most portion of the hose reel. This permanent connection is achieved by supply station 84E having an extended connection line 88 that extends from main supply line 54 downward to a center point at one end of hose reel 58. An end of the permanently connected hose 30A extends into hose reel 58 to permit its connection to the end of pipe extension 88.

Return station 90E also includes a slightly different structure than the other return stations 90A–90D. Foremost, the return line 110 of station 90E extends straight downward from return line 56 whereas the respective return lines 110 of stations 90A–90D include a right angle configuration for facilitating use of the valves 28 and 114. Return line 110 of return station 90E facilitates connection of an end of permanently connected hose 30A to valve 28 at a location along side and adjacent to hose reel 58.

FIG. 3 further illustrates a fluid-filled hose labeled 30B, 30C, 30D, 30E to represent multiple hoses like fluid-filled hose 30 (FIGS. 1 and 2) that can be simultaneously connected to manifold 20 in parallel. Of course, hose 30A always is connected to and in fluid communication with manifold 20. Each fluid-filled hose establishes an independent zone of fluid circulation between the hose (e.g. hose 30B) and the hot water heating system 10 via manifold 20. For example, hose 30B would have one end (with a quick disconnect valve) removably connected to a reciprocating quick disconnect valve 24 of supply station 84A while the other end of hose 30B (with a quick disconnect valve) is removably connected to a reciprocating quick disconnect valve 28 of return station 90A. In similar fashion, hose 30C can be removably connected between fluid supply station 84B and fluid return station 90B. Accordingly, if all four hoses (30B–30E) are removably connected to a respective pair of fluid supply and return stations of manifold 20, then a total of five independent zones of circulation are established between the respective hoses (30A–30E) in parallel and the manifold 20 of hot water heating system 10. Of course, not all of the hoses 30B–30E need be connected.

Figure 4:
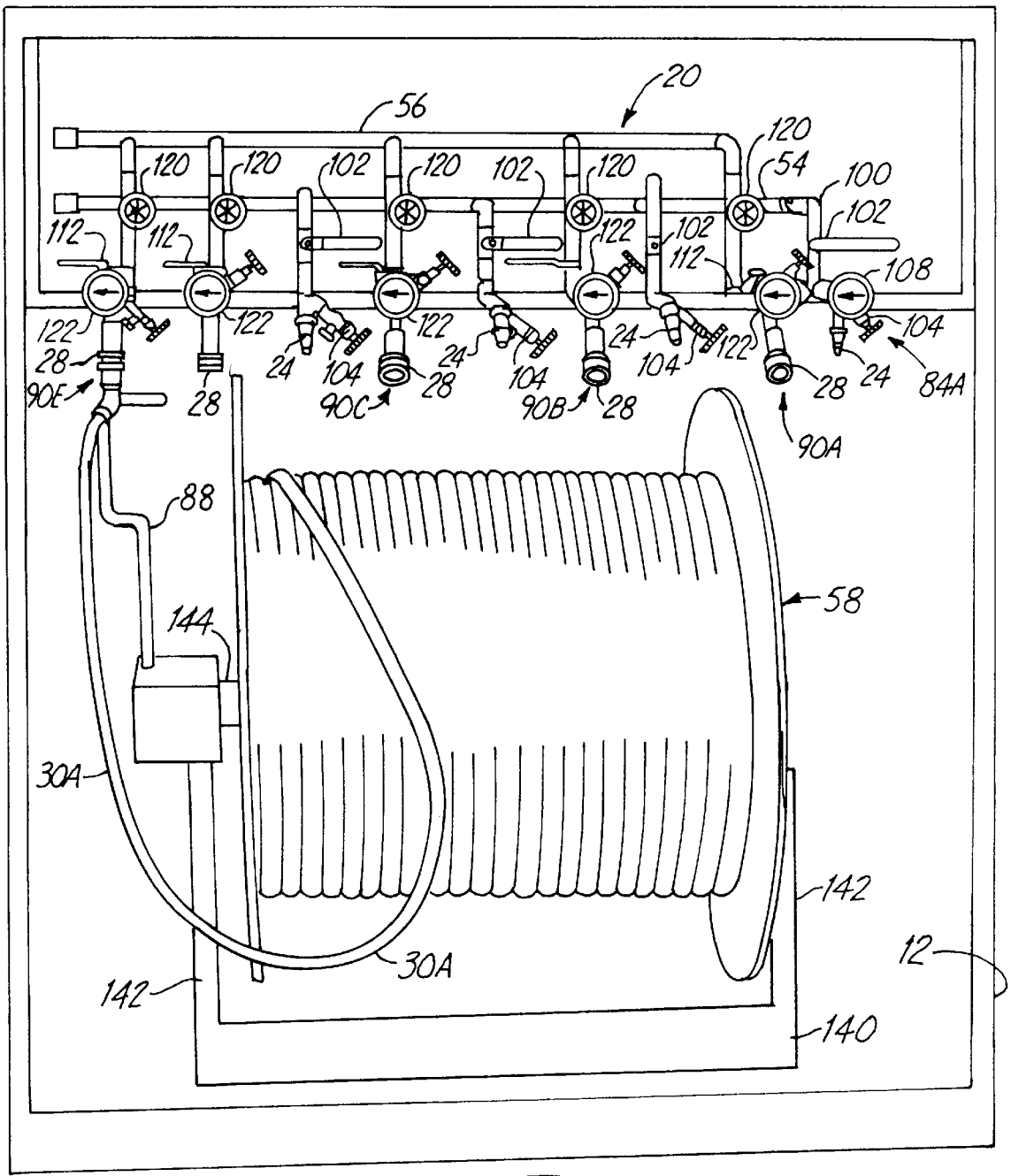
FIG. 4 is an end plan view in elevation illustrating a manifold and hose reel of a portable hot water heating system of the present invention.

FIG. 4 further illustrates the physical relationship and proximity between manifold 20 and hose reel 58. Accordingly, manifold 20 will not be discussed in detail. As shown in FIG. 4, hose reel 58 includes base 140, supporting arms 142 and spindle 144. Supporting arms 142 and spindle 144 cooperate with a gear mechanism (not shown) for controlling rotating movement of hose reel 58 relative to frame 140 to permit winding and unwinding of a hose 32 about hose reel 58. Hose reel 58 preferably is an electric rewind hose reel, Model EP2400, obtainable from Nordic Systems, Inc. of Mississauga (Toronto), Ontario. Hose reel 58 is operated by a reversing drum switch, Class 2601, Series B, and a foot switch, Type AW, Series C, obtainable from Square D of Raleigh, N.C.

As shown in FIG. 4, one end of hose 30A is connected to fluid return station 90E at valve 28. As shown, hose reel 58 also corresponds to an in-use position in which several hoses, normally layered on top of hose 30A, have been removed from hose reel 58 prior to connection to the respective supply stations 84A–84D and return stations 90A–90D.

Figure 5:
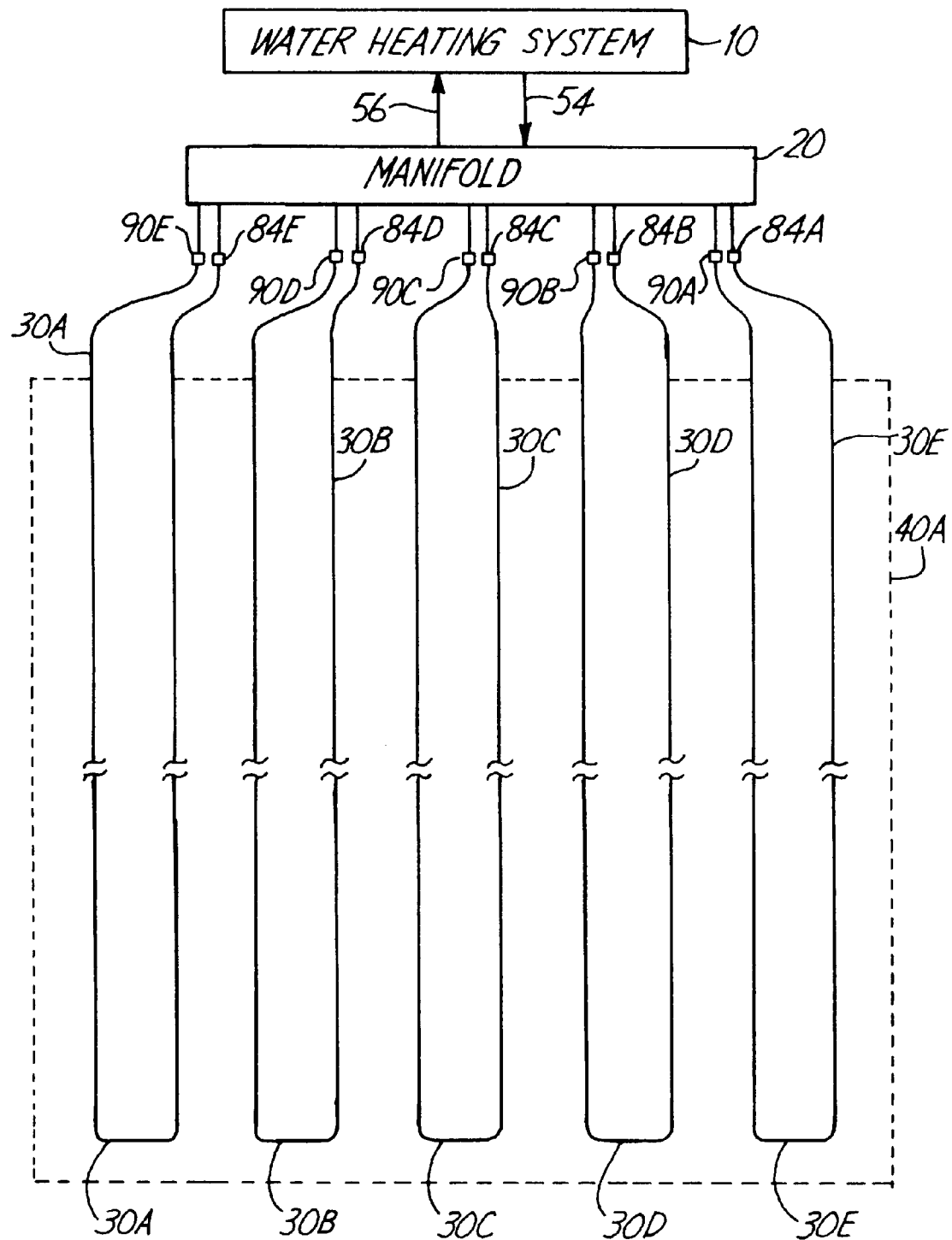
FIG. 5 is a plan view illustrating a multi-zone use of a flexible conduit and manifold of the present invention in a method of thawing frozen ground.

FIG. 5 is a schematic diagram illustrating the connection of multiple hoses 30A–30E to hot water heating system 10 via manifold 20. As shown, each hose 30A–30E is connected to a pair of fluid supply and return stations (e.g. 84A and 90A, 84B and 90B, 84C and 90C, 84D and 90D, and 84E and 90E, respectively). With each of hoses 30A–30E connected to manifold 20 in this manner, a continuous circulation of heated fluid is established between the hoses 30A–30E and the hot water heating system 10 so that a heated fluid circulates independently within all five hoses 30A–30E at a temperature between 170° F. and 150° F. As shown in FIG. 5, the hoses 30A–30E are laid out over a target zone 40A such that each section of hose is approximately 12 to 24 inches apart from each other thereby establishing a target zone 40A of about 2500 square feet (when 12 inches apart) to about 5000 square feet (when 24 inches apart). When hoses 30A–30E are maintained over target zone 40A for a period of 24 hours with heated fluid circulating therethrough, heat radiated from the hoses 30A–30E will thaw a 5,000 sq. ft. area to a depth of about 12 inches per day. Since the boiler 42 and remainder of hot water heating system 10 operate efficiently on conventional fuel oil, the cost of thawing the 5,000 sq. ft. area to a depth of 12 inches in a one 24 hour period costs merely $50.

Moreover, each of the heating zones established by hoses 30A–30E operate independently so that only a single hose (e.g. 30E) can be operated if desired. A single hose 30E in operation with hot water heating system 10 creates a target zone of approximately 625 sq. ft.

Hoses 30A–30E are preferably covered with a tarp or other suitable temporary cover to facilitate reflecting heat radiated by the hoses back into the ground target zone 40A.

Figure 6:
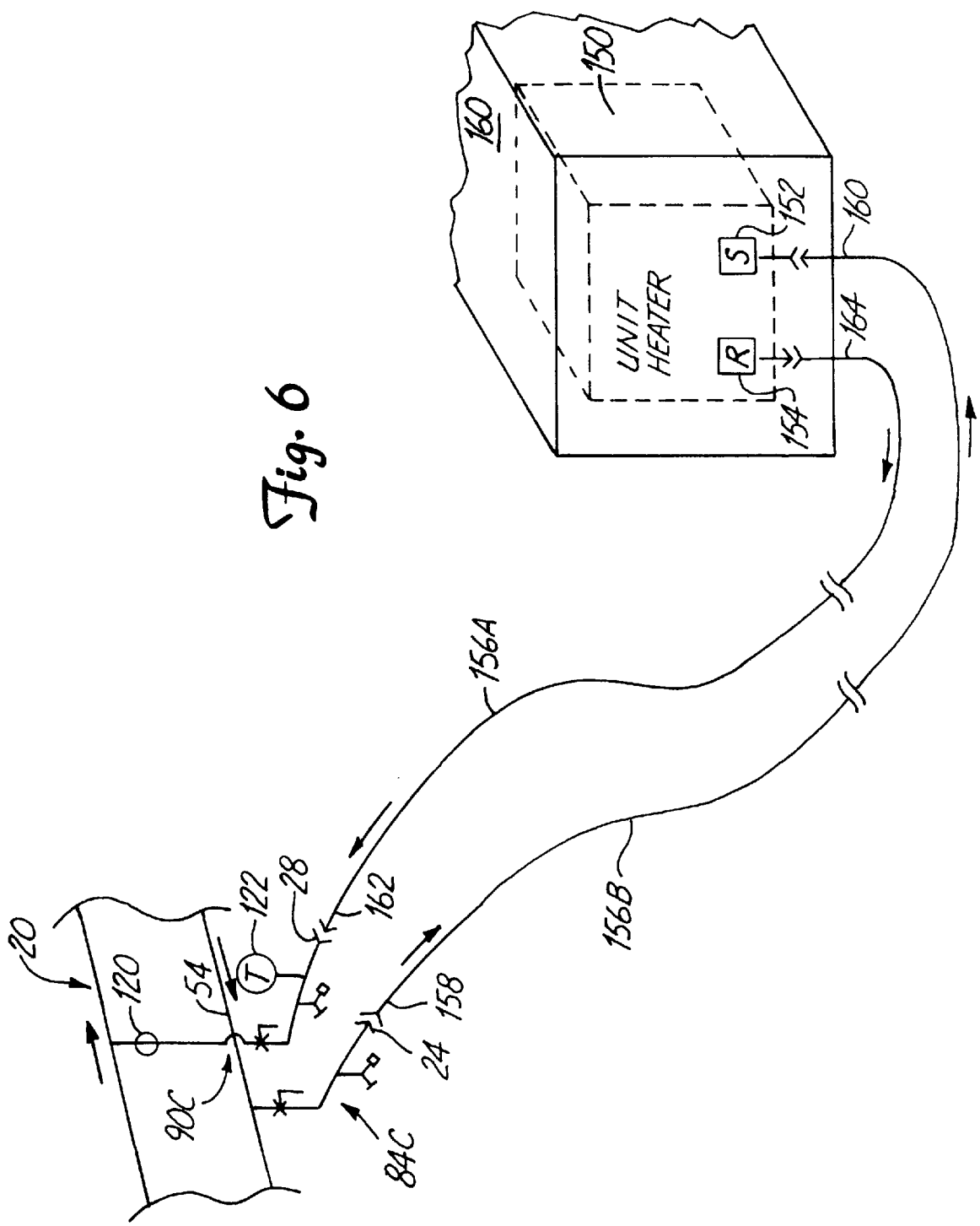
FIG. 6 is an isometric view schematically illustrating a portable unit heater connected to manifold of the present invention in a method of temporarily heating a building.

As shown in FIG. 6, unit heater 150 is used in a method of temporary heating of building 160. Unit heater 150 is connected to hot water heating system 10 via manifold 20 at a fluid supply and return station (e.g. 84C and 90C). Unit heater 150 includes a fluid supply station 152 and a fluid return station 154. Supply station 152 includes a female dripless quick disconnect valve whereas return station 154 includes a male dripless quick disconnect valve. A pair of hoses 156A and 156B are supplied for connecting unit heater 150 to manifold 20. Each hose 156A and 156B includes a dripless quick disconnect valve at each end, one valve being a male connector and the other valve being a female connector. As shown in FIG. 6, 156B acts as a fluid supply hose in which a first end 158 of hose 156 is removably connected to male quick dripless disconnect valve 24 of fluid supply station 84C and the other end 160 of hose 156B is removably connected to female dripless disconnect valve of unit heater supply station 152. Likewise in a similar fashion, end 162 of fluid return hose 156A is connected to quick disconnect valve 28 of fluid return station 90C and the other end 164 of hose 156A is connected to quick disconnect valve of fluid return station 154 of unit heater 150. The connection of hoses 156A and 156B to unit heater 150 via the pairs of quick disconnect valves establishes a continuous circulation of fluid from hot water heating system 10 through manifold 20 into unit heater 150 via hose 156B and back to hot water heating system 10 via hose 156A. Hoses 156A and 156B are approximately 200 feet in length so when connected to unit heater 150, this fluid circulation loop has an effective loop length of approximately 500 feet, roughly equal to the length of one of hoses 30A–30E (see FIG. 4).

Unit heater 150 is a conventional portable unit heater known to those skilled in the art which includes a heating element heated by the circulating fluid supplied by hose 156B. Heat radiated from the heating element is blown throughout building 160 by a motor and fan of unit heater 150. Similar to the multi-hose zone application in FIG. 5, several unit heaters 150 can be deployed in building 160 upon their connection to the respective supply and return stations of manifold 20 via supply and return hoses.

With this arrangement, unit heater 150 in conjunction with hot water heating system 10 can temporarily heat a building 160 without introducing noxious fumes, open flames, carbon dioxide or carbon monoxide discharge within building 160 since the hot water heating system 10 remains outside building 160. Moreover, hoses 156A and 156B have a construction like hose 30 so that the extra fluid capacity necessary for creating the hot water heating zone with unit heater 150 is provided by fluid already contained under pressure within hoses 156A and 156B prior to their removable connection between unit heater 150 and manifold 20 of hot watering heating system 10. Finally, upon disconnection of hoses 156A and 156B from unit heater 150 and manifold 20 of hot water heating system 10, the fluid is retained within hoses 156A and 156B so that little or no adjustment to the fluid capacity of the hot water heating system 10 or unit heater 150 need be made upon removal of the hoses 156A and 156B.

Figure 7:
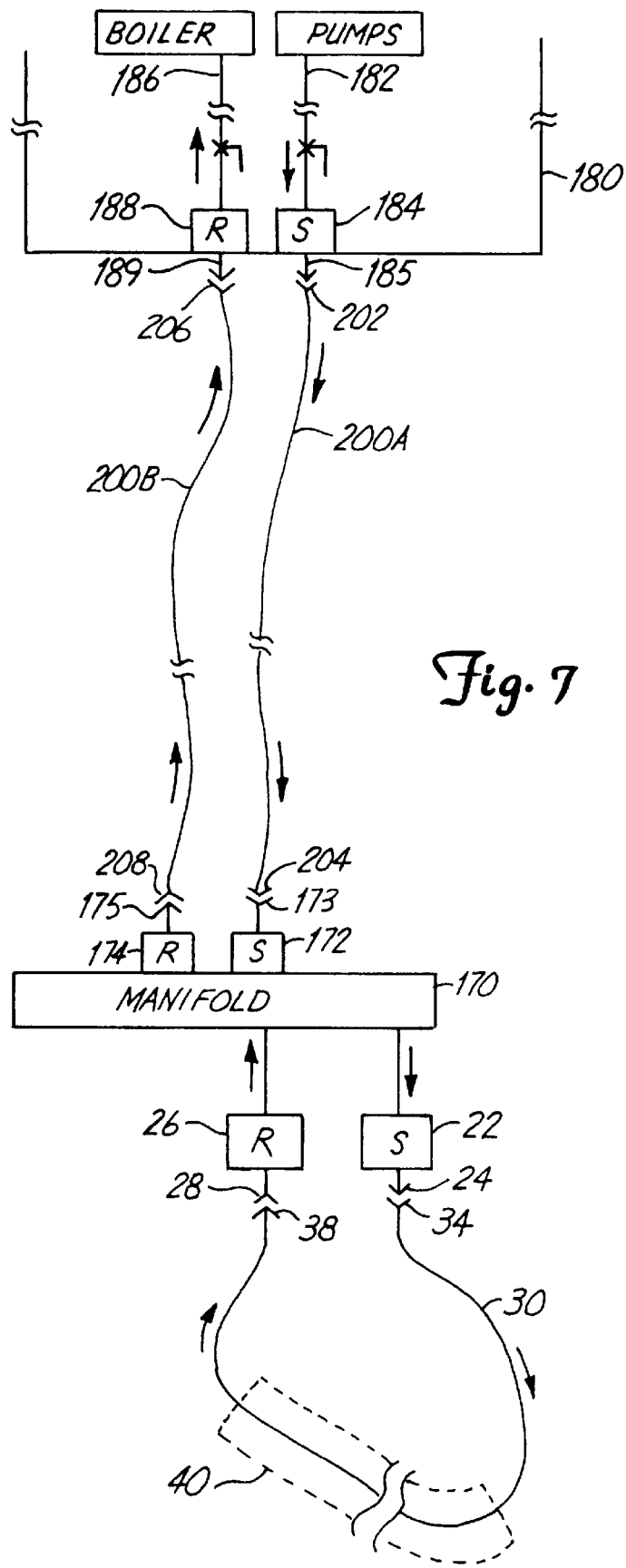
FIG. 7 is a plan view schematically illustrating a manifold of the present invention remotely located from a portable hot water heating system.

FIG. 7 illustrates another method of using apparatus 8 of the present invention including hot water heating system 10. In this embodiment, a hot water heating system 180 is connected to a remote manifold 170. Manifold 170 generally has a construction much like manifold 20. Accordingly, the same reference numerals are used to identify fluid supply station 22, fluid supply disconnect valve 24, fluid return station 26 and fluid return disconnect valve 28. Hose 30 includes a respective female quick disconnect valve 34 and male disconnect valve 38 similar to that shown in FIG. 1 and 2. Likewise, hot water heating system 180 has a construction similar to hot water heating system 10 as shown in FIGS. 1 and 2 except manifold 170 is not directly connected to supply conduit 54 and return conduit 56 as is shown for hot water heating system 10 in FIG. 2. Instead, fluid supply conduit 182 terminates in a fluid supply station 184 having a male dripless quick disconnect valve 185, and return fluid line 186 terminates in a fluid return station 188 having quick disconnect valve 189. Accordingly, hot water heating system 180 is not directly connected to manifold 170 as manifold 20 is directly connected to hot water heating system 10 in the embodiment of FIG. 2.

In this embodiment, manifold 170 is remotely located from hot water heating system 180 (e.g. about 50 feet away). Manifold 170 is connected to hot water heating system 180 via a pair of fluid supply and return hoses 200A and 200B. Each hose 200A, 200B has a construction similar to that of hose 30 but having a slightly larger diameter to accommodate a greater volume of fluid flow through the respective hoses 200A, 200B. Each hose 200A, 200B has a dripless quick disconnect valve at each end for connection to the respective return and supply stations on hot water heating system 180 and remote manifold 170.

In particular, quick disconnect valve 202 of supply hose 200A is connected to supply station disconnect valve 185 of hot water heating system 180 and quick disconnect valve 204 at the other end of supply hose 200A is connected to quick disconnect valve 173 of manifold supply station 172. Similarly, quick disconnect valve 206 of return hose 200B is connected to return quick disconnect valve 189 of fluid return station 188 of hot water heating system 180 while quick disconnect valve 208 of return hose 200B is connected to quick disconnect valve 175 of manifold return station 174. Hoses 200A and 200B establish a continuous circulation of fluid between hot water heating system 180 and remote manifold 170.

Since remote manifold 170 is located about 50 feet away from heating system 180, heating system 180 also incorporates optional circulating pump 52 (operating in parallel with circulating pump 50) as shown in FIG. 2. The addition of circulating pump 52 ensures high speed circulation of heated fluid from heating system 180 to remote manifold 170 over the added conduit distance of 100 feet (50 feet for hose 200A and 50 feet for hose 200B).

This remote manifold system 170 operates similar to manifold 20 relative to hot water heating system 10 to supply hose 30 with a continuous circulation of heated fluid for radiating heat from hose 30 to thaw frozen ground in a target area 40. However, remote manifold 170 permits the deployment of hoses like hose 30 at locations which are not easily accessible by hot water heating system 180 or system 10. For example, portable hot water heating system 180 (on trailer 12) can be located on a bluff and remote manifold 170 can be extended downward from the bluff to permit placement of hoses such as hose 30 on a surface adjacent the bluff. Accordingly, having a remote manifold 170 can greatly increase the types of surfaces and areas to be serviced by the portable hot water heating system 180.

Hoses 30, 30A–30E have been described with a male or female quick disconnect valve such as valves 34, 38 at the ends of the hose 30. In addition, manifold 20 has been described with quick disconnect valves 24 and 28. However, other suitable valve fittings can be placed at the end of hose 30 or on manifold 20 to achieve the same function of removable connection to a reciprocating valve fitting to prevent the dripping or spilling of fluid from hose 30 and to retain fluid within hose 30 under pressure between the ends of hose 30 (both prior to connection and upon disconnection of hose 30 relative to manifold 20 of hot water heating system 10). For example, although less convenient, a manual ball valve along with a removable connector could be substituted for the quick couplings or quick disconnect valves at the ends of hose 30. The manual ball valves would permit selective opening and closing of the ends of hose 30 to respectively permit and prevent fluid flow under pressure through hose 30 when connected to manifold 20, while the removable connectors would permit selective connection and disconnection of hose. Other valve fittings known in the art can be used in a similar fashion to achieve the function of a fluid-filled hose that maintains fluid within the hose under pressure prior to connection and upon disconnection of the hose relative to manifold 20 of hot watering heating system 10. Moreover, if necessary, the access points for circulation through hose 30 need not be at the terminal ends of hose 30 but can be along an intermediate portion of hose 30.

The portable hot water heating system of the present invention has numerous advantages, particularly when used in a method of thawing frozen ground or a method of temporary heating for a building. First, a flexible fluid-filled conduit removably connectable to portable hot water heating system permits instant creation of a hot water heating zone as an extension of the portable hot water heating system. The fluid capacity necessary to operate the independent heating zone is automatically supplied with the flexible fluid-filled conduit by virtue of the quick coupling valves located at the ends of the fluid-filled conduit which retain fluid under pressure within the conduit both prior to connection and upon disconnection of the conduit relative to the hot water heating system. A manifold of the hot water heating system permits up to five independent heating zones to be deployed to thaw frozen ground or another surface. Moreover, a pair of fluid-filled flexible conduits of the present invention can be removably connected between manifold of the hot water heating system and a portable unit heater wherein the unit heater uses heated fluid circulated by the flexible conduit to provide temporary heating to a building located remotely from the hot water heating system of the present invention. Finally, a manifold can be deployed remotely from the portable hot water heating system to facilitate deploying the fluid-filled flexible conduit at a location inaccessible by the portable hot water heating system. The remote manifold is connected to and in fluid communication with the portable hot water heating system via a pair of fluid-filled flexible conduits similar to the conduits deployed in the first method of thawing frozen ground and the method of temporary heating for a building.

What is claimed is:

1. A manifold system for use with a portable, closed loop hot water-type heating system, the heating system including a boiler, an expansion tank, and a circulating pump, the boiler, tank and pump being connected together and in fluid communication in series, and further including a fluid supply conduit extending to the manifold system from the circulating pump and a fluid return conduit extending from the manifold system to the boiler, the manifold system comprising:

a quick disconnect supply valve connected to and in fluid communication with the supply conduit;

a quick disconnect return valve connected to and in fluid communication with the return conduit; and a flexible conduit having a first end and a second end with each end having a quick disconnect valve, the conduit containing a fluid retained therein under pressure between the quick disconnect valves, wherein the quick disconnect valve at the first end of the hose is removably connectable to the quick disconnect supply valve and the quick disconnect valve at the second end of the hose is removably connectable to the quick disconnect return valve, wherein upon connection of the conduit to the quick disconnect supply and return valves of the manifold system, a continuously circulating loop of fluid is established between the hot water heating system and the conduit, and wherein upon disconnection of the conduit to the quick disconnect supply and return valves of the manifold system, fluid is retained under pressure within the conduit between the quick disconnect valves.

2. The manifold system of claim 1 wherein the manifold system further comprises:

a plurality of quick disconnect supply valves connected to and in fluid communication with the supply conduit;

a plurality of quick disconnect return valves connected to and in fluid communication with the return conduit; and a plurality of flexible conduits wherein each conduit has two ends with each end having a quick disconnect valve and each conduit containing a fluid retained therein under pressure between the quick disconnect valves with one quick disconnect valve of each conduit being removably connectable to one of the quick disconnect supply valves of the manifold system and the other quick disconnect valve of each conduit being removably connectable to one of the quick disconnect return valves of the manifold system, wherein upon connection of each conduit to the respective supply and return valves of the manifold system, each connected conduit establishes a continuously circulating loop of fluid under pressure with the hot water heating system operating in parallel with the other conduits removably connected to the hot water heating system.

3. A portable, closed loop hot water heating system comprising a boiler, an expansion tank, and a circulating pump, wherein the boiler, tank and pump are connected together and in fluid communication in series, a fluid supply conduit extending from the circulating pump, a fluid return conduit extending from the boiler, and a manifold system comprising:

at least one supply quick disconnect valve connected to and in fluid communication with the supply conduit;

at least one return quick disconnect valve connected to and in fluid communication with the return conduit;

at least one flexible conduit having a first end and a second end with each end having a quick disconnect valve, the conduit containing a fluid retained therein under pressure between the quick disconnect valves, wherein the quick disconnect valve at the first end of the hose is removably connectable to the quick disconnect supply valve and the quick disconnect valve at the second end of the hose is removably connectable to the quick disconnect return valve, wherein upon connection of the conduit to the quick disconnect supply and return valves of the manifold system, a continuously circulating loop of fluid is established between the hot water heating system and the conduit, and wherein upon disconnection of the conduit to the quick disconnect supply and return valves of the manifold system, fluid is retained under pressure within the conduit between the quick disconnect valves at the ends of the conduit.

4. A portable, closed loop hot water heating system comprising a boiler, an expansion tank, and a circulating pump, wherein the boiler, tank and pump are connected together and in fluid communication in series, and a supply conduit extending from the circulating pump and a return conduit extending from the boiler, a manifold system comprising:

a first conduit connecting the supply conduit and the return conduit permitting fluid communication therebetween for permitting circulation of a fluid under pressure throughout the heating system;

a quick disconnect supply valve connected to and in fluid communication with the supply conduit;

a quick disconnect return valve connected to and in fluid communication with the return conduit;

a second flexible conduit removably connectable to the hot water heating system, the second conduit having two ends with each end having a quick disconnect valve wherein, prior to connection to the supply and return valves of the manifold system, the second conduit contains a fluid under pressure therein between the quick disconnect valves, with one quick disconnect valve of the second conduit being removably connectable to the quick disconnect supply valve and the other quick disconnect valve of the second conduit being removably connectable to the quick disconnect return valve, wherein upon connection of the second flexible conduit to the quick disconnect supply and return valves, a continuous circulation of fluid under pressure is established between the hot water heating system and the second flexible conduit.

5. The heating system of claim 4 wherein the first conduit comprises:

a flexible hose extending between the supply conduit and the return conduit, the hose having a length suitable for extension a substantial distance away from the heating system and adapted for radiating heat from the fluid circulating through the hose.

6. The heating system of claim 5 wherein the first conduit has a length of about 500 feet.

7. A portable fluid circulation loop for use with a closed loop hot water-type heating system, the heating system defining a continuously circulating closed path of fluid under pressure and having a quick disconnect supply valve and a quick disconnect return valve, the portable loop comprising:

a flexible conduit having a quick disconnect valve at each of its ends, the conduit containing a fluid under pressure between the quick disconnect valves, wherein the quick disconnect valves of the conduit are removably connectable to the respective quick disconnect supply valve and the quick disconnect return valve of the hot water heating system to establish continuous circulation of fluid from the heating system, through the conduit, and back into the heating system, and wherein the conduit and quick disconnect valves of the conduit are configured and arranged so that both prior to connection of the conduit to the hot water heating system upon disconnection of the conduit to the hot water heating system, fluid is retained under pressure within the conduit between the quick disconnect valves of the conduit.

8. A remote manifold system locatable remotely from a hot fluid heating system, the heating system defining a continuously circulating loop of fluid under pressure, the remote manifold system comprising:

a manifold having a fluid supply hose removably connectable to the hot water heating system and a fluid return hose removably connectable to the hot water heating system to permit continuous circulation of fluid under pressure between the manifold and the hot water heating system, the fluid supply hose and fluid return hose having a length to permit the manifold to be located a substantial distance away from the hot water heating system, the manifold further having a first quick disconnect supply valve and a second quick disconnect return valve, both supply and return valves being in communication with the continuous loop of fluid circulating through the manifold;

a flexible hose having a third and fourth quick disconnect valve at each end of the hose, the hose containing a fluid under pressure between the quick disconnect valves, wherein the third and fourth quick disconnect valves of the hose are removably connectable to the first quick disconnect supply valve and the quick disconnect return valve of the manifold to establish circulation of fluid from the manifold, through the hose, and back into the manifold, and wherein upon selective disconnection of the third and fourth quick disconnect valves of the hose from the first quick disconnect supply valve and second quick disconnect return valves of the manifold, fluid is retained under pressure within the hose between the third and fourth quick disconnect valves of the hose.

9. The system of claim 8 and further comprising:

the hot water heating system having a fifth quick disconnect supply valve and a sixth quick disconnect return valve;

the manifold having a fluid supply reservoir, a fluid return reservoir, a seventh quick disconnect return valve, an eighth quick disconnect supply valve, with both the seventh quick disconnect return valve and the second quick disconnect return valve of the manifold being in communication with the fluid supply reservoir of the manifold, and both the eighth quick disconnect supply valve and the first quick disconnect supply valve of the manifold being in communication with the fluid return reservoir of the manifold;

each of the fluid supply and return hoses having a quick disconnect valves at their respective ends with each hose containing fluid under pressure between the quick disconnect valves, with the fluid supply hose being removably connectable between the fifth quick disconnect supply valve of the hot water heating system and the seventh quick disconnect supply valve of the manifold, and the fluid return hose being removably connectable between the sixth quick disconnect return valve of the hot water heating system and the eighth quick disconnect return valve of the manifold, wherein prior to connection of, and upon selective disconnection of, the fluid supply and return hoses between the hot water heating system and the manifold, fluid is retained under pressure within the fluid supply and return hoses between the quick disconnect valves of the respective hoses.

10. A portable, closed loop hot water-type heating system for providing temporary heat to a building, the system comprising a boiler, an expansion tank, and a circulating pump, wherein the boiler, tank and pump are connected together and in fluid communication in series, a supply conduit in fluid communication with and extending from the circulating pump, a return conduit in fluid communication with and extending from the boiler, a fluid maintained within the heating system under pressure and circulating throughout the heating system and a manifold system, the manifold system comprising:

a quick disconnect supply valve in fluid communication with the supply conduit;

a quick disconnect return valve in fluid communication with the return conduit, a unit heater capable of radiating heat and having a quick disconnect supply port and a quick disconnect return port;

a first flexible hose and a second flexible hose with each hose having two ends with each end having a quick disconnect valve, each hose containing a fluid therein under pressure between the quick disconnect valves, wherein the quick disconnect valve at one end of the first hose is removably connectable to the quick disconnect supply valve of the manifold and the other quick disconnect valve at the other end of the first hose is removably connectable to the quick disconnect supply port of the unit heater, and the quick disconnect valve at one end of the second hose is removably connectable to the quick disconnect return valve of the manifold and the quick disconnect valve at the other end of the second hose is removably connectable to the quick disconnect return port of the unit heater, wherein upon prior to connection of and upon selective disconnection of, the unit heater and the manifold, fluid is retained under pressure within each of the first and second hoses between the quick disconnect valves of each respective hose.

11. A method of thawing frozen ground comprising:

locating a closed loop portable hot water heating system adjacent an area of frozen ground to be thawed, the hot water heating system defining a continuous loop of hot fluid circulating under pressure and having a quick disconnect supply valve and a quick disconnect return valve;

connecting a flexible hose to the hot water heating system, with each end of the hose having a quick disconnect valve, wherein prior to connection to the hot water heating system, the hose contains a fluid under pressure between the quick disconnect valves, with the quick disconnect valve at one end of the hose being removably connectable to quick disconnect supply valve of the heating system and the quick disconnect valve at the other end of the hose being removably connectable to the quick disconnect return valve of the heating system, wherein upon connection of the hose to the hot water heating system, hot fluid circulates between the hot water heating system and the hose, wherein upon selective disconnection of the quick disconnect valves of the hose from the respective quick disconnect supply and return valves of the hot water heating system, the hose retains fluid under pressure between the quick disconnect valves of the hose;

arranging the hose on the ground area to be heated so that hot fluid circulates through the hose to radiantly heat the ground area; and maintaining the hose over the ground area for a select amount of time to the thaw ground area.

12. A portable closed hot liquid heating system for thawing frozen ground comprising:

a heater for heating liquid having an inlet and an outlet;

an expansion tank connected to and in fluid communication with the outlet of the heater;

a circulating pump connected to and in fluid communication with the expansion tank;

a supply conduit connected to and in fluid communication with the circulating pump;

a return conduit connected to and in fluid communication with the inlet of the heater;

a manifold connected to and in fluid communication between the supply conduit and the return conduit, the manifold including:

at least one pair of quick disconnect valves including a quick disconnect supply valve connected to the supply conduit and a quick disconnect return valve connected to the return conduit.

13. The system of claim 12 wherein the manifold further includes:

a return flow indicator connected to and in fluid communication with the return conduit between the return conduit and the quick disconnect return valve; and a return temperature indicator connected to and in fluid communication with the return conduit between the quick disconnect return valve and the return conduit.

14. The system of claim 13 wherein at least one manual ball supply valve is connected between the supply conduit and the quick disconnect supply valve and at least one manual return ball valve is connected between the return conduit and the quick disconnect return valve.

15. The system of claim 12 and further comprising:

a make-up fill tank and a fill pump, the fill tank provided for holding a quantity of liquid and the fill pump connected between and in fluid communication with the fill tank and the expansion tank.

16. The system of claim 12 and further comprising:

an air scoop connected between and in fluid communication with the heater, the expansion tank, and a connecting conduit extending from the circulating pump.

17. The system of claim 12 and further comprising:

at least one flexible hose having a first end removably connectable to the quick disconnect supply valve of the manifold and a second end removably connectable to the quick disconnect return valve of the manifold, wherein prior to connection and upon disconnection of the hose with the hot water heating system, the hose retains a fluid therein under pressure between the quick disconnect valves.

18. The system of claim 17 and further comprising:

a hose reel for storing the hose about the hose reel, the hose reel being capable of automatically winding the hose about the reel, the rotating movement of the reel being controllable via a foot pedal.

19. A portable closed loop hot liquid heating system, comprising:

a heater for heating and circulating a liquid, the heater having a heater inlet and a heater outlet;

a circulation conduit having a conduit inlet and a conduit outlet;

a manifold being interposed between and being in fluid communication with the heater and the circulation conduit, the manifold having at least one pair of quick disconnect valves being a quick disconnect supply valve and a quick disconnect return valve, the quick disconnect supply valve being removably, fluidly coupled to the conduit inlet and the quick disconnect return valve being removably, fluidly coupled to the conduit outlet.

* * * * *